United States Patent [19]

Hamamura

[11] Patent Number: 5,387,356
[45] Date of Patent: Feb. 7, 1995

[54] PROCESS OF PRODUCING CALCINED MATERIALS FOR FERRITE MAGNET

[75] Inventor: Atsushi Hamamura, Kyoto, Japan

[73] Assignee: Sumitomo Special Metals Co., Ltd., Osaka, Japan

[21] Appl. No.: 219,999

[22] Filed: Mar. 30, 1994

[30] Foreign Application Priority Data

Sep. 28, 1993 [JP] Japan .................. 5-265869

[51] Int. Cl.$^6$ .............................. C04B 35/26
[52] U.S. Cl. .................. 252/62.58; 252/62.59; 252/62.63; 423/594
[58] Field of Search .............. 252/62.58, 62.59, 62.63; 423/594

[56] References Cited

U.S. PATENT DOCUMENTS 5,053,156 10/1991 Okumori et al. ............ 252/62.63
5,061,412 10/1991 Okumori et al. ............ 264/24

FOREIGN PATENT DOCUMENTS 55-157215 12/1980 Japan ............ 252/62.63
58-194305 11/1983 Japan ............ 252/62.63
59-194405 11/1984 Japan ............ 252/62.63

*Primary Examiner*—Jack Cooper
*Attorney, Agent, or Firm*—Watson, Cole, Grindle & Watson

[57] ABSTRACT

It is an object of the present invention to provide a process of producing calcined materials for ferrite magnet, whereby foreign phase produced in calcined powders is eliminated and the ferrite magnet having a superior magnetic properties is obtained easily. Since mill scales roughly milled into a mean particle size of 20 $\mu$m or less is subjected to primary oxidation treatment to change its oxidation percentage 95% or higher, and oxidized completely by secondary oxidation treatment in an inclined rotary kiln up to 700° C. in an atmosphere containing $O_2$ content of 8% to 10% at a charging side of raw material, foreign phase is not produced in the calcined powders during ferrite formation at high temperatures, and the ferrite magnet having a superior magnetic properties can be obtained.

7 Claims, No Drawings

PROCESS OF PRODUCING CALCINED MATERIALS FOR FERRITE MAGNET

BACKGROUND OF THE INVENTION

1. Field of the Invention

The present invention relates to a process of producing calcined materials for a ferrite magnet, whereby iron oxide which is inexpensive and obtained from mill scales and which has a coarse particle size is fired in an inclined rotary kiln, and more particularly to a process of producing calcined materials for a ferrite magnet, having good magnetic properties, the magnet being obtained by roughly milling the mill scales into a necessary particle size for primary oxidation treatment to change an oxidation percentage of the mill scales to 95% or higher, and after blending and mixing with oxide or carbonate of Sr or Ba, fired up to 700 ° C. by secondary oxidation treatment under a specific $O_2$ content in an atmosphere at a charging side of raw materials of the inclined rotary kiln.

2. Description of the Prior Art

In general, a ferrite magnet ($MO-nFe_2O_3$, M:Sr or Ba, n=5.0 to 6.2) is produced by calcining, milling, pressing and sintering, after mixing iron oxide obtained from mill scales composed of composition (wt %) shown in Table 1 with oxide or carbonate of Sr or Ba. In the calcining process, the iron oxide and oxide or carbonate of Sr or Ba are mixed and calcined in an inclined rotary kiln at 1300° C. to 1350° C. in air for ferrite formation.

Since oxygen in the kiln atmosphere is consumed during the ferrite formation at high temperatures in the inclined rotary kiln, at the charging side for raw materials the $O_2$ content in the atmosphere is reduced to 5% or less. Thus after the primary oxidation treatment, the iron oxide obtained from the mill scales which is not completely oxidized is hardly oxidized more than in that state, and during the ferrite formation at the high temperatures, a foreign phase ($Sr(Ba)O.2Fe_2O_3$) maybe produced in the calcined powders, with the magnetic properties of the finally obtained magnet being deteriorated.

TABLE 1

| T.Fe | FeO | $Fe_2O_3$ | $Fe_3O_4$ | $SiO_2$ | $Al_2O_3$ | MgO | CaO |
|------|------|------|------|------|------|------|------|
| 74.88 | 67.5 | 21.0 | — | 0.25 | 0.15 | 0.005 | 0.20 |

Since the mill scale contains a large amount of FeO besides $Fe_2O_3$, the mill scale as a source of iron oxide must be oxidized completely in the atmosphere containing $O_2$ or in air before mixing with the oxide or carbonate of Sr or Ba.

However, in order to oxidize a large amount of mill scales completely in the atmosphere containing $O_2$ or in air first, the mean particle size of the mill scale must be made as fine as possible (12 μm or less) before the oxidation treatment. Therefore, it takes a long time for milling, and moreover, fine powders less than 1 μm are exhausted as dusts during the calcining; resulting in a high production cost and in a low productivity.

Therefore, the applicant has proposed a process of producing a ferrite magnet (Japanese Patent Application Laid Open No. Hei 3- 242908, U.S. Pat. No. 5,061,412), whereby mill scales milled into a specific particle size of 12 μm or less are completely oxidized, until the $Fe_2O_3$ content in the mill scales is raised to 98.0% or more, and mixed with a fixed quantity of SrO of BaO source, to obtain the ferrite magnet through the necessary treatment after calcining.

However, there was such a problem that, since the mill scales are hard and tough, it not only takes a long time to be milled below 12 μm, but also coarse particles tend to remain in the fine particles. Therefore, in the case of calcining in the inclined rotary kiln at high temperatures of 1300° C. to 1350° C., an $O_2$ content in the rotary kiln is consumed by the ferrite formation and the $O_2$ content flowed through the charging side of raw material is reduced to cause deceleration of final oxidation of the mill scale. As a result, a foreign phase ($Sr(Ba)O.2Fe_2O_3$) is produced in the calcined powders as previously mentioned, and deterioration and variations of magnetic properties of the finally obtained magnet are caused.

SUMMARY OF THE INVENTION

It is an object of the present invention to provide a process of producing calcined materials for a ferrite magnet (basic composition of molar ratio; n=5.0 to 6.2 of $Fe_2O_3/MO$, where M=Sr or Ba), whereby any foreign phase produced in the calcined powders is eliminated and a ferrite magnet having superior magnetic properties is obtained.

In the present invention, since mill scales are completely oxidized by secondary oxidation treatment up to 700° C., after primary oxidation treatment, in an inclined rotary kiln in an atmosphere of 8 to 10% $O_2$ content at a charging side of raw material, during a ferrite formation at high temperatures, the foreign phase is not produced in the calcined powders, and there is no deterioration of the magnetic properties in the finally obtained magnet, thus in the case of Sr ferrite magnet using the calcined materials based on the present invention, the calcined materials are milled into fixed particle size, pressed in a magnetic field and sintered to obtain a high performance Sr ferrite magnet having permanent magnet properties of Br=4.1 to 4.8 (kG), Hc=3.0 to 3.5 (kOe), (BH) max=4.0 to 4.4 (MGOe) and iHc=3.1 to 3.6 (kOe).

DETAILED DESCRIPTION OF THE PREFERRED EMBODIMENTS

In the present invention, the reason why a milled particle size of mill scales before primary oxidation treatment is restricted to 20 μm or less is that, if the mean particle size exceeds 20 μm, the oxidation treatment takes a long time and in the following secondary oxidation treatment, foreign phase is apt to be produced, and it takes a long time to mill after the primary oxidation treatment.

In the present invention, temperatures of the primary oxidation treatment are kept at 600 ° C. to 900 ° C., because when the temperature is less than 600 ° C., the oxidation reaction of FeO contained in the mill scales to $Fe_2O_3$ is not sufficient, and when the temperature exceeds 900 ° C., there is the possibility of melting in a portion of the mill scales or coarse grain growth, which are not desirable because of negative influences on milling efficiency in the later processes, and also not desirable because of thermal energy loss.

The primary oxidation treatment time is preferably 0.1 to 1.5 hours, because when it is less than 0.1 hour, the primary oxidation reaction is not sufficient, and when it exceeds 1.5 hours, there is grain growth due to the sintering reaction.

In the present invention, when expressing an oxidation percentage of the mill scales to $Fe_2O_3$ after primary oxidation treatment, it can be expressed by the following chemical formula, and when a quantity of mill scales is designated by M, the oxidation percentage can be expressed by the following formula, whereby the oxidation percentage of the mill scales can be calculated by incremental weigh of the mill scales after the primary oxidation treatment.

In the present invention, the oxidation percentage of less than 95% after the primary oxidation treatment is not preferable, because the mill scales can not be oxidized completely also in the following secondary oxidation, and there is the possibility of producing the foreign phase in the calcined powders.

$$FeO_{3-x} + x/2.O_2 = Fe_2O_3$$

$(159.7 - 16x)g + 16xg = 159.7g$ (where, weight of $O_2$ is 48g)

$$\text{Oxidation Percentage} = \frac{\text{total oxygen weight} - \text{incremental weight after oxidation}}{\text{total oxygen weight}}$$

$$= \frac{(M/159.7 \times 48) - \frac{M}{(159.7 - 16x)} \times 16x}{M/159.7 \times 48}$$

Dimensions of the inclined rotary kiln in the present invention are, a length is 15 m to 30 m, an inside diameter of 1.0 m to 2.0 m, a height at the charging side of raw material higher than that at the discharging side of calcined powder, and an inclination is preferably, inclination height/rotary kiln length of 15/1000 to 40/1000. A rotation speed of the rotary kiln is preferably 0.5 rpm to 3 rpm.

The reason why the oxygen content in the atmosphere at the charging side of raw material of the inclined rotary kiln is restricted to 8% to 10% in the secondary oxidation treatment of the present invention is that, if it is less than 8% there is the possibility that the mill scales is not oxidized completely, and if it exceeds 10%, excessive air is blown into the inclined rotary kiln to cause a negative pressure in the rotary kiln.

The reason why the secondary oxidation treatment temperature is restricted to less than 700° C. is that, if it reaches a temperature region above 700° C. ferrite formation results that is different from the reaction region in which the mill scale oxidation reaction takes place.

The reason why the calcining temperature is restricted to 1275° C. to 1300° C. is that there is the possibility of incomplete densification and crystal growth in the ferrite formation at less than 1275° C., and above 1300° C. the possibility of a high $O_2$ consumption in the high temperature region, and reduction of $O_2$ content in the atmosphere at the charging side of raw material to cause insufficient oxidation of the mill scales. The calcining time is preferably 15 minutes to one hour.

The ferrite magnet according to the present invention may contain, for improving the densification during sintering or magnetic properties, at least, one kind of $SiO_2$, $Cr_2O_3$, CaO, $Al_2O_3$, CoO and NiO by 2% or less as additives. When impurities such as $TiO_2$, MgO, $SiO_2$, $Al_2O_3$, etc., are contained in the mill scales, it is necessary to add magnetic separation and flotation processes previously.

EXAMPLE

Example 1

After milling mill scales having compositions (wt %) shown in Table 2 mechanically into a mean particle size of 15 μm, primary oxidation treatment was performed in a rotary kiln at 800° C. for one hour in air to mill into the mean particle size of 2 μm. At that time, an oxidation percentage of the mill scale was 95%.

Thereafter, the said iron oxide blended and mixed with $SrCO_3$ was granulated and subjected to secondary oxidation treatment at 680° C. in atmosphere containing 9% $O_2$ at the charging side of raw material of an inclined rotary kiln having a length of 29 m, an inside diameter of 1.8 m, inclination (inclination height/kiln length) of 20/1000 and a rotation speed of 1.5 rpm, then calcined in air at 1275° C. for one hour for further milling to obtain a mean particle size of 5 μm. As a result of component identification by an x-ray diffraction analysis of the calcined powders, foreign phase ($SrO.2Fe_2O_3$) was not detected.

Successively, after adding and mixing $SiO_2$ 0.45% and CaO 0.65% as additives, finely milled into a mean particle size of 0.75 μm, compacted in a parallel magnetic field of 7.5 kOe at a pressure of 0.48 T/cm², then sintered in air at 1250° C. for one hour to obtain a Sr ferrite magnet. Permanent magnet properties of the obtained Sr ferrite magnet are shown in Table 3.

TABLE 2

| T.Fe | FeO | $Fe_2O_3$ | $Fe_3O_4$ | $SiO_2$ | $Al_2O_3$ | MgO | CaO |
|---|---|---|---|---|---|---|---|
| 75.3 | 72.44 | 27.18 | — | 0.26 | 0.17 | 0.007 | 0.19 |

Comparative Example 1

The mill scales as same as the Example 1 was milled mechanically into a mean particle size of 15 μm and subjected to oxidation treatment under the same condition as the Example 1, the oxidation percentage of the mill scale at that time was 95%.

Thereafter, as same as the Example 1, after blending and mixing $SrCO_3$ with iron oxide for granulation, a mixture was calcined in an inclined rotary kiln at 1305° C. for one hour in air. In this case, $O_2$ content in the atmosphere at the charging side of raw material of the rotary kiln was 4%. As a result of component identification by an x-ray diffraction analysis of the calcined powders, 5% or more foreign phase ($SrO \propto .2Fe_2O_3$) was detected.

After adding the same additives as the Example 1 to the obtained calcined powders, a Sr ferrite magnet was produced under the same condition. Permanent magnet properties of the obtained Sr ferrite magnet are shown in Table 3.

TABLE 3

| | Br(kG) | Hc(kOe) | (BH)max (MGOe) | iHc (kOe) |
|---|---|---|---|---|
| Example 1 | 4.22 | 3.12 | 4.27 | 3.28 |
| Comparative Example | 4.24 | 2.74 | 4.31 | 2.76 |

As it is apparent from the example, the present invention is that, since the mill scales which is roughly milled into a necessary particle size and whose oxidation percentage is changed to 95% or more by primary oxidation, is oxidized completely by secondary oxidation in an inclined rotary kiln up to 700° C. in an atmosphere of $O_2$ content of 8 to 10% at a charging side of raw material, a foreign phase is not produced in the calcined powders during ferrite formation at high temperatures, and a ferrite magnet having a superior magnetic properties can be obtained.

What is claimed is:

1. A process of producing calcined materials for a ferrite magnet of the formula $MO \cdot nFe_2O_3$ where M is Sr or Ba and n=5.0 to 6.2, comprising subjecting mill scales milled into a mean particle size of 20 μm or less to a primary oxidation treatment at 600° to 900° C. in an atmosphere containing $O_2$ or in air to effect an oxidation percentage of the mill scales to 95% or higher, mixing the so oxidized mill scales with an oxide or carbonate of Sr or Be, subjecting said mixture to a secondary oxygen treatment in an inclined rotary kiln at a temperature up to 700° C. in an atmosphere of $O_2$ content of 8 to 10% at the charging side of the mixture in said kiln to effect complete oxidation of the mill scales, and calcining the so-treated mixture at 1275° to 1300° C. in an oxidizing atmosphere.

2. A process of producing calcined materials for ferrite magnet in accordance with claim 1, wherein the ferrite magnet contains at least one of $SiO_2$, CaO, $Al_2O_3$, $Cr_2O_3$, CoO and NiO in an amount of 2% or less as additives.

3. A process of producing calcined materials for ferrite magnet in accordance with claim 1, whereby calcining in the inclined rotary kiln is performed at 1275° C. to 1300° C. for 15 minutes to one hour.

4. A process of producing calcined materials for ferrite magnet in accordance with claim 1, wherein an inclination height/length of the inclined rotary kiln is 15/1000 to 40/1000.

5. A process of producing calcined materials for ferrite magnet in accordance with claim 1, wherein a rotation speed of the inclined rotary kiln is 0.5 rpm to 3 rpm.

6. A process of producing calcined materials for ferrite magnet in accordance with claim 1, wherein the inclined rotary kiln has a length of 15 to 30 m and an inside diameter of 1.01 to 2.0 m.

7. A process of producing calcined materials for ferrite magnet in accordance with claim 1, wherein permanent magnet properties of the ferrite magnet are; Br=4.1 to 4.3 (kG). Hc=3.0 to 3.5 (kOe), (BH)max=4.0 to 4.4 (MGOe) and iHc=3.1 to 3.6 (kOe).

* * * * *